United States Patent [19]

Di Chiara

[11] 4,074,683

[45] Feb. 21, 1978

[54] WALKER WITH TRAY

[76] Inventor: Anthony J. Di Chiara, 10 St. Paul's Crescent, Garden City, N.Y. 11530

[21] Appl. No.: 693,604

[22] Filed: June 7, 1976

[51] Int. Cl.2 .......... F16M 13/08; A45B 3/00

[52] U.S. Cl. .......... 135/67; 211/164; 211/170; 248/139; 280/289 A

[58] Field of Search .......... 135/67; 297/148, 149, 297/151, 153, 5, 6, 314; 248/130, 137, 139, 141, 142, 230, 371; 280/289 A, 289 WC; 224/30 A, 36, 42.03 A; 108/159; 99/396, 397, 398

[56] References Cited

U.S. PATENT DOCUMENTS

| | | | |
|---|---|---|---|
| 242,424 | 6/1881 | Beutley | 99/397 |
| 1,040,916 | 10/1912 | Fell | 99/397 |
| 2,430,235 | 11/1947 | Mendenhall | 135/67 |
| 2,745,465 | 5/1956 | Hogan | 135/67 |
| 2,759,525 | 8/1956 | Ries | 135/67 X |
| 3,142,511 | 7/1964 | Rebel | 297/149 |
| 3,152,536 | 10/1964 | Lucas | 248/371 |
| 3,221,678 | 12/1965 | Doherty | 248/230 |
| 3,235,212 | 2/1966 | Baumiller, Jr. | 248/137 |
| 3,249,368 | 5/1966 | Ginzburg | 297/6 |
| 3,635,522 | 1/1972 | Kerwit | 297/153 |
| 3,658,079 | 4/1972 | Block | 135/67 |

*Primary Examiner*—Werner H. Schroeder
*Assistant Examiner*—Conrad L. Berman
*Attorney, Agent, or Firm*—E. Janet Berry; Lawrence Rosen

[57] ABSTRACT

A walker for infirm individuals with provision for supporting a cradle for a removable tray, and the tray at the front of the walker. The cradle may be arranged to swing to remain level at all times or may be rigidly secured to the walker.

3 Claims, 5 Drawing Figures

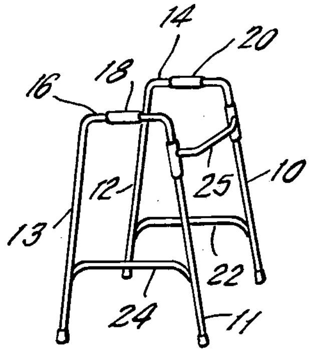
FIG. 2
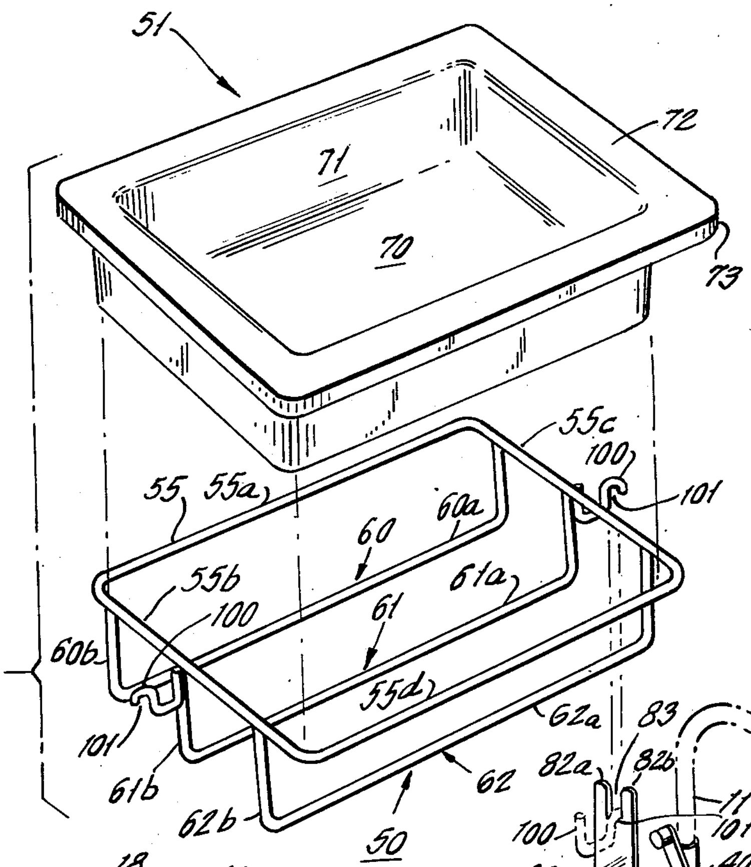
FIG. 3
FIG. 1
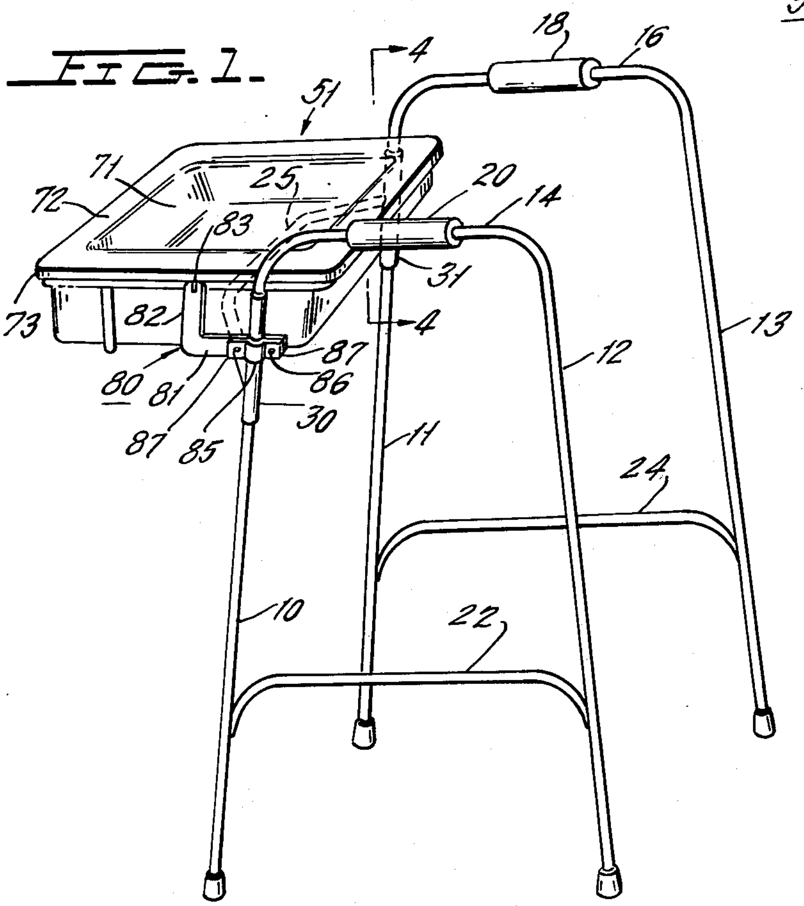
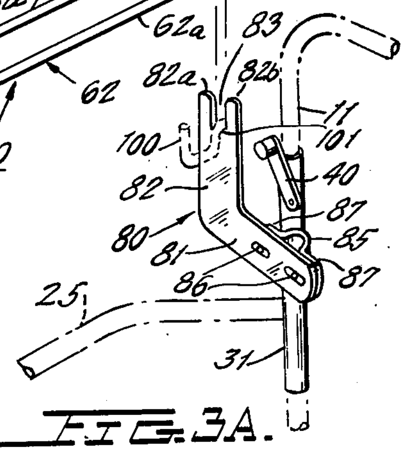
FIG. 3A
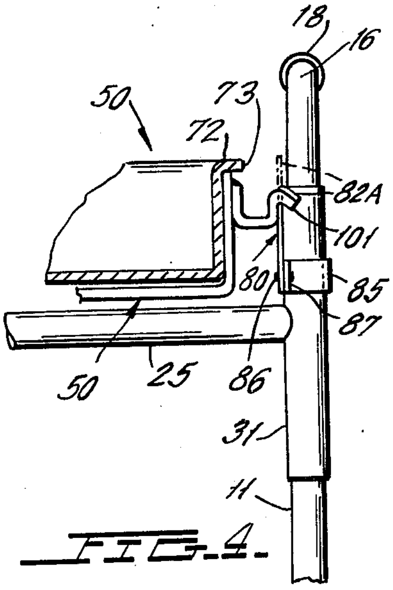
FIG. 4

WALKER WITH TRAY

BACKGROUND OF THE INVENTION

The present invention relates to walkers, that is to devices which are used by people with walking disability or who are otherwise infirm to assist them in movement.

Essentially the structure which has now become known as a "walker" is a device which consists of four connected legs so arranged that the person using the device may stand inside the device between the four legs and utilize crossbars extending parallel to the intended path of movement and which connect a pair of legs on each side, as handles by which the walker may be used to support the person who is using the same and by which the walker may be moved ahead to provide support for advancing movement.

The lower ends of the legs are generally and preferably provided with friction cups or other devices which will ensure a secure engagement with the floor while the connecting bars at the top on each side may if necessary be provided with appropriate handle structures to ease the utilization of the walker.

Frequently the walker is made as a collapsible structure in which the two legs which are intended to extend in front of the user are connected by a crossbar. These two legs are then rotatably connected or supported by the crossbar or structure attached thereto. Each of the two front legs is then part of a frame which includes the rear leg on each side; each of these frames may be swung toward the front of the unit in order to provide a collapsed and easily stored structure as well and may also be swung outwardly to open the unit to full supporting position. Appropriate latches may also be provided to hold the unit in the extended or open position.

A major problem which occurs in the use of the walker is that, since it is a two-handed device and the person using it is usually infirm because of injury or other disability of the legs or because of age the person using the walker cannot carry any other object and certainly cannot take care of himself or herself in for instance preparing meals and carrying the necessary plates, objects and other materials back and forth, which activities are entailed in preparation of meals or for that matter in the performance of other household chores. Thus, very frequently a person who requires such a walker and who otherwise would be able to manage very well even though living alone finds it necessary to enter or join some community group where his or her needs may be taken care of.

BRIEF DESCRIPTION OF THE INVENTION

The present invention is directed to the mounting of a cradle or support on the walker itself which in turn will support a removable tray which can be carried about independently if desired and which can be cleaned independently of the walker. This tray may then be used by the person using the walker to deposit various objects therein including glasses or cups of fluid, plates, filled or otherwise, even cooking ware from the stove. The walker may then be used to carry these items and arrange them so that they may be used or so that a meal may be set up or other of the personal needs of the individual be taken care of.

By thus providing a carrier for objects in conjunction with the walker a person who must use the walker and who otherwise would require special assistance to perform almost any task requiring the carrying of an object or even a cup of coffee from one place to another would now no longer require such assistance and would now no longer be required, if such assistance were not available at home, to enter a community type of residence where such help would be available.

Essentially, therefore the purpose of the present invention is the provision on a walker type of device, whether or not the walker is collapsible, of a cradle or other support which is so arranged on the walker that the walker may be utilized in the normal way and may even be collapsed if it is a collapsible walker. Nevertheless the cradle is so arranged that it will support a removable tray and thereby permit the user of the walker to take care of his or her own needs to a much greater extent than has heretofore been possible; and especially permit the user of the walker to carry objects about and move them from one place to the other while nevertheless having both hands occupied in the use of the walker.

The present invention contemplates in addition that the cradle which supports the tray may be arranged on the front part of the walker above the crossbar if a crossbar is used, with the cradle being so supported that it may, if desired, be free swinging, that is it may be supported at its center of gravity in such manner that it would tend to stay level even as the walker is tilted slightly during movement.

Since the cradle and its tray are supported above the crossbar, the degree of swing of the tray if such swing occurs is nevertheless inhibited by the presence of the crossbar to make sure that a violent movement of the walker would not disturb the cradle or the tray sufficiently to dump materials out of the cradle or tray.

It may also be desirable to so weight the cradle or tray where it is supported just above the crossbar that the tendency of the cradle or tray to swing away from a horizontal position is inhibited by the crossbar.

Where the cradle or tray is perfectly balanced, then it is free-swinging. It is also possible to rigidify the connection in the event the free-swinging arrangement is not acceptable for utilization by the particular individual where, for instance, it may be necessary for the particular individual, because of his or her own habits, or particular method in utilizing the walker in such manner, that the walker may tend to move more violently than is customary. In the usual case, however, the user of a walker learns very quickly not to lift the walker because that removes all support but to slide the walker gently forward as the individual steps and such users of walkers become quite proficient especially in utilizing minimum lift on the walker and the walker is generally slid along the floor with minimum variation in attitude of the walker.

DETAILED DESCRIPTION OF THE INVENTION

The primary object of the present invention therefor is the provision of a novel walker arrangement and particularly a cradle therefor so arranged that materials may be carried about by the user of the walker.

A further object of the present invention is the provision of such cradle so that it may if desired be swingingly secured to the front of the walker and balanced so that it will stay level at all times even should the walker be slightly tilted.

A further object of the present invention is the arrangement of the walker so that the cradle for supporting the carry-about tray is carried substantially forward of the walker so it does not interfere with the utilization of the walker by the individual and thus permits the individual to enter into the walker so that the hands of the individual may easily grasp the horizontal support sections of the walker thereby supporting the individual while at the same time providing the means for the individual to carry materials about while using the walker.

The foregoing and many other objects of the present invention will become apparent in the following description and drawings in which:

FIG. 1 is a view in perspective of the novel walker of the present invention with the cradle attached thereto and the tray in the cradle showing the structure which may thus be utilized by an individual both to obtain full support from the walker and to enable the individual to carry the objects food and other materials about so that the individual may care for himself or herself.

FIG. 2 is another view in perspective of one form of presently readily available walker to which the cradle structure of the present invention may be attached.

FIG. 3 is an expanded view in perspective showing both the cradle and the tray and a method or interengagement.

FIG. 3A is a view in perspective aligned with the expanded view of FIG. 3 showing how the cradle may be supported on the walker on one side side thereof, it being understood that the other side is similarly supported.

FIG. 4 is a cross-sectional view taken on line 4—4 of FIG. 1 locking in the direction of the arrows and showing a modified use of the cradle support of FIG. 3A wherein elements hereinafter described of the structure of FIG. 3A may be pinched together to provide further securement for the cradle if that is desired.

Referring now to FIGS. 1 and 2, there is shown what may be regarded as a standard walker which by itself constitutes no part of the present invention. The standard walker in this case has a pair of front legs 10 and 11, a pair of rear legs 12 and 13. The front legs and rear legs are connected together by at least the upper horizontal crossbars 14 (connecting the legs 10 and 12) and 16 (connecting together the legs 11 and 13). These horizontal crossbars are usually and preferably provided with hand grips 18 and 20 respectively so that a person utilizing the walker may find it easy to hold onto the horizontal structures 16 and 14. In the usual walker construction, in order to strengthen the same, the legs 10 and 12 are also interconnected by the horizontal bar 22 and the legs 11 and 13 are interconnected by the lower horizontal bar 24. The front legs 10 and 11 are interconnected in any suitable manner as for instance by the crossbar 25.

Thus, the user of the walker actually physically enters the walker at the rear end, defined by the vertical legs 12 and 13, grasps the horizontal bars 14 and 16 usually utilizing the hand-hold elements 18 and 20 and is thus able to support himself of herself within the walker, the walker legs being spaced and themselves maintained in the correct geometric formation essentially by the crossbar 25, the front and rear legs being spaced by the bars 14 and 22 and 16 and 24 respectively.

In the usual walker device, some provision is made for collapsing the walker for easy storage. One form of such collapsing arrangement is provided by utilizing two sleeves 30, 31 cooperating with the legs 10 and 11 in which each of the legs 10 and 11 is fully rotatable. Thus it will be seen that when the leg 10 is rotated in the sleeve 30 the frame consisting of the members 10, 14, 12 and 22 may be rotated toward the crossbar 25. Similarly when the leg 11 is rotated with respect to the sleeve 31 the frame consisting of the members 11, 16, 13 and 24 may also be rotated toward the crossbar thereby providing a simplified method of collapse. Simplified means may also be provided, not part of the present invention, to maintain the sleeves 30, 31 in position. The simplest means that can be utilized for this purpose is an arrangement where the legs 10 and 11 are at a slight angle to each other and the sleeves 30 and 31 are at a similar slight angle to each other. Consequently the sleeves 30 and 31 cannot slide down on the legs 10 and 11 since that would require spreading of the crossbar 25 which is a rigid member. In addition or, if desired, instead of the foregoing, positioning pieces or washers may be provided on the legs 10 and 11 above and below the sleeves 30, 31 so that the legs may readily rotate in the sleeves 30 and 31 without sliding longitudinally with respect thereto, thereby ensuring that the members may be rotated toward and away from collapse.

In FIG. 3A there is also indicated but there is no need to describe the same mechanically a latch member 40 which may be utilized in connection with each of the sleeves 30, 31 on each of the legs 11 and 10 releasably to lock the walker in the open position. This is not specifically described because the method of collapsing the walker or the method of erecting the walker and retaining the same in erected position is not a part of the present invention.

The essential element of the present invention is shown particularly in perspective in FIG. 1 and in the views of FIGS. 3, 3A and 4.

The present invention provides a cradle 50 constructed of a plurality of stainless steel rods which are bent or shaped to the proper configuration and fastened together by means of tack welds where such interconnection is required. The stainless steel rods may be SS 302–304 but of course may be of any other material which will form a cradle or support for a removable tray 51. The reason for the utilization of a removable tray is that since the device is intended to carry foods and other materials which may require that the tray be washed at frequent intervals it is more convenient to have the tray 51 a removable tray resting in and on the cradle 50 than to have the tray itself necessarily integrated with the walker. The cradle will of course be of sufficient width to reach substantially between the opposite front legs 10 and 11 of the walker and of sufficient fore and aft length so that it will be able to contain ordinary plates or other articles which the individual may require. The cross bar 25 serves, as previously pointed out, to limit the swing of cradle 50 with respect to the walker in the event of an unexpected movement of the walker.

In the instance shown, the cradle 50 is made of a rectangular wire run 55 forming the front section *55a*, the two side sections *55b*, *55c* and the rear section *55d*. In order to provide appropriate supports for any tray that may be placed in the frame 55, the cradle is also provided with U-shaped members 60, 61, 62 each consisting of a horizontal rung *60a*, *61a*, *62a* and a pair of vertical legs *60b*, *61b*, *62b* on each side. The upper ends of the vertical legs are secured in any suitable manner to the frame sections *55b* and *55c* as by tack welding or in any other manner.

While the material here referred to is stainless steel other materials which may be formed into the framelike cradle 50 may be utilized. The tray 51 has a bottom wall 70, a peripheral side wall 71, a peripheral top flange 72 extending horizontal from the peripheral side wall 71 and, if desired, a peripheral lip 73 extending from the top flange 72. The top flange 72 is arranged so that it will rest on the frame 55 and the peripheral lip, where used, 73 is arranged so that it will overlie the rungs or sections 55*a*, 55*b*, 55*c*, 55*d* of the frame 55 of the cradle 50.

Preferably, the top tray 51 is a plastic device somewhat elastic and the side may be a relatively tight fit around the frame 55 so that tray 51 will stay integrated with cradle 50 until it is desired to remove the tray. However, in general, for the operation of the present invention, the tray need not necessarily be such a tight fit when it is expected that the user may not have the manual strength necessary to pull the tray out of the cradle.

The cradle itself may be made free-swinging. The cradle 50 is attached to the walker between the legs 10 and 11 by the utilization of angle brackets 80 as shown particularly in FIGS. 1 and 3A. The angle brackets 80 are provided on each side; and each comprises a horizontal run 81, a vertical extension 82 and a slot 83 extending to the upper end of the extension 82. The angle bracket is secured to the front legs 10 and 11 and preferably to the sleeves 30, 31 by a clamp member 85 on each side, which clamp member engages the sleeve 30, 31 on each side securely and is screwed, riveted or otherwise attached by passing such attaching elements 86, 86 through the wings 87, 87 of the horizontal section 81 of the bracket thereby integrating the bracket 80 on each side with the front of the walker.

The cradle 50 is provided with a support 100 on each side. In this case the support 100 is a U-shaped member which is secured to the vertical legs 61*b* of the center section 61 of the frame. The essential element of support member 100 is the reentrant curved element 101 on each side. Each of the reentrant curved elements 101 on each side will be received by the open ended vertical slot 83 in the upwardly directed extension 82 of the bracket 80.

It will thus be seen that with the cradle 50 and the tray 51 usually carried thereby in normal balanced condition the cradle will swing slightly with respect to the support bracket 80 and thereby tend to stay level when the load in the tray is properly balanced and the walker is used in the usual way.

It is, however, possible, if a further integration of the cradle with the walker is desired, to pinch the sections 82*a* and 82*b* of the upward extension 82 of the bracket together in order to provide a more secure integration of the cradle 50 with the bracket 80. This pinching together is indicated schematically, as shown, in FIG. 4 where, in this case, the members 82, 83 have been pinched down hard right on to the reentrant section 101 of the support member 100.

The cradle here has been described as made of stainless steel and it can of course be made of other materials including plastic. Since the cradle is, for practical purposes, permanently attached to the walker it should, if made of plastic, be made with an open mesh bottom and sides or even plastic rods or wires so that it may readily be cleaned out without having to be removed from the walker and so that it will not normally retain materials.

The tray is necessarily removable since it will be required to carry foods as well as other materials and thus should be readily available independently of the walker for washing.

In the foregoing, the present invention has been described solely in connection with preferred illustrative embodiments thereof. Since many variations and modifications of the invention will now be obvious to those skilled in the art, it is preferred that the scope of the invention herein set forth be defined not by the specific examples herein set forth but only by the appended claims.

The embodiments of the invention in which a specific privilege or property is claimed are defined as follows:

1. A walker for infirm individuals and a tray cradle therefor;
   - said walker comprising a pair of front legs and a pair of rear legs;
   - a horizontal bar connecting each front leg to a rear leg, the said front and rear leg and horizontal bar on each side forming a frame;
   - the said horizontal bar on each side providing a hand grip;
   - a crossbar interconnecting said front legs and forming said walker into a rectangular structure which may be entered from the rear by the infirm individual who may then grip said horizontal bars;
   - and a cradle supported between said front legs and extending substantially forward of said front legs and also extending above said crossbar;
   - said cradle being swingably supported between said front legs to stay level during use;
   - and a removable tray supported in said cradle;
   - said cross-bar extending adjacent the rear end of said cradle and forming a stop and support for said end of said cradle;
   - the support for said cradle comprising a bracket member secured to and extending forward of each front leg; a vertically directed slot in each bracket member having an opening substantially at the top of said bracket member;
   - a securing member extending in part, horizontally from each side of said cradle;
   - said securing member being receivable in and resting in said slot.

2. The walker and cradle of claim 1 wherein said cradle is swingably supported in said slots between said front legs each slot being defined by a pair of parallel vertical extensions of said bracket; said extensions being deformable to engage and retain said securing member on each side.

3. The walker and cradle of claim 1 wherein said horizontal bar on each side being mounted for rotation on said crossbar toward and away from said crossbar; said side frame on each side being rotatable toward said crossbar with the cradle in place to collapse said walker.

* * * * *